(12) United States Patent
Koenig

(10) Patent No.: US 7,154,204 B2
(45) Date of Patent: Dec. 26, 2006

(54) MAGNETIC RETURN PATH AND PERMANENT-MAGNET FIXING OF A ROTOR

(75) Inventor: Tilo Koenig, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/499,362

(22) PCT Filed: Dec. 18, 2002

(86) PCT No.: PCT/DE02/04629

§ 371 (c)(1),
(2), (4) Date: Jun. 18, 2004

(87) PCT Pub. No.: WO03/088449

PCT Pub. Date: Oct. 23, 2003

(65) Prior Publication Data

US 2005/0017587 A1    Jan. 27, 2005

(30) Foreign Application Priority Data

Apr. 12, 2002   (DE) ............................... 102 16 098

(51) Int. Cl.
*H02K 21/12*   (2006.01)
(52) U.S. Cl. .................. 310/156.19; 310/216

(58) Field of Classification Search ........... 310/156.01, 310/156.16–156.22, 156.48, 156.51, 216, 310/261
See application file for complete search history.

(56) References Cited

U.S. PATENT DOCUMENTS

| 4,954,736 A | 9/1990 | Kawamoto et al. |
| 5,670,838 A | 9/1997 | Everton |
| 5,760,520 A | 6/1998 | Hasebe et al. |

FOREIGN PATENT DOCUMENTS

| HU | 199637 B | 5/1989 |
| WO | WO 01/63726 A2 | 8/2001 |

*Primary Examiner*—Thanh Lam
(74) *Attorney, Agent, or Firm*—Ronald E. Greigg

(57) ABSTRACT

A rotor for an electric motor having a short-circuit element that has lamination packets in which the laminations of the short-circuit element are embodied with spring elements which press from two sides against permanent magnets of the rotor and as a result center the permanent magnets in the lateral direction independently of production tolerances. After the insertion of the permanent magnets between the spring elements, the short-circuit element with the permanent magnets is potted, for instance with synthetic resin, or spray-coated with plastic. The rotor has the advantage that it compensates for production tolerances of the permanent magnets.

19 Claims, 2 Drawing Sheets

MAGNETIC RETURN PATH AND PERMANENT-MAGNET FIXING OF A ROTOR

CROSS-REFERENCE TO RELATED APPLICATIONS

This application is a 35 USC 371 application of PCT/DE 02/04629 filed on Dec. 18, 2002.

BACKGROUND OF THE INVENTION

1. Field of the Invention

The invention relates to an improved rotor for an electrical machine, in particular for an electric motor.

2. Description of the Prior Art

It is known for rotors, for instance for brushless DC motors (BLDC motors), to be embodied with short-circuit element, on whose circumference permanent magnets are disposed. The short-circuit element can be assembled as a lamination packet made of laminations. For fastening purposes, it is known to glue the permanent magnets to the short-circuit element or to pot the short-circuit element and the permanent magnets with a synthetic resin or spray-coat them with plastic. Potting with synthetic resin is a kind of adhesive bonding. It is also known to insert the short-circuit element with the permanent magnets into a guard tube. A common feature of all these options is that the permanent magnets are positioned on the short-circuit element and must be retained during the curing of the adhesive, synthetic resin or plastic or during the insertion into the guard tube. In injection molding, holders must be provided in an injection tool that keep the permanent magnets positioned on the short-circuit element during the injection operation. In potting, the permanent magnets, which have tolerances, are placed in recesses of the short-circuit element that also have tolerances and are consequently potted in undefined positions.

One problem in positioning the permanent magnets on the short-circuit element is the production tolerance of the permanent magnets. Since the production tolerances, as dimensions become smaller, do not decrease to the same extent as the dimensions themselves, relative inaccuracies increase as the size of the permanent magnets and rotors decreases. The term "relative inaccuracy" means a tolerance with respect to absolute component dimensions. Particularly when rare earth magnets are used, which have a magnetic force multiple times higher than typical ferrite magnets and can therefore be smaller, an inaccuracy in positioning makes itself felt, because of the small absolute dimensions of the magnets and rotor.

Inaccurate positioning of the permanent magnets of a rotor makes itself felt in unequal so-called resting moments, which are dependent on an angular position of the rotor. In operation of the electric motor, an increased moment waviness and running behavior that is dependent on the direction of rotation can occur.

SUMMARY AND ADVANTAGES OF THE INVENTION

The invention is intended in particular for small permanent magnets, such as the aforementioned rare earth magnets, and for small rotors and small motors. However, the invention can in principle be used for all sizes of electrical machines and rotors, as well as all types of magnet. The rotor according to the invention has a short-circuit element with a lamination packet, comprising laminations, as well as a number of permanent magnets disposed on the short-circuit element. Laminations of the lamination packet of the short-circuit element of the rotor have at least one fixation element, which is integral with the laminations. The permanent magnets are fixed between two fixation elements, which are disposed preferably opposite one another with respect to the fixed permanent magnets. Preferably, each lamination has one or more pairs of fixation elements, and one permanent magnet is fixed between one pair of fixation elements. However, it is also possible for one permanent magnet to be fixed between two fixation elements of different laminations, so that laminations with one fixation element or individual fixation elements instead of one or more pairs of fixation elements are possible. Besides laminations with fixation elements, the rotor can also have laminations without fixation elements. With its fixation elements, one lamination fixes and in particular clamps a plurality of permanent magnets of the rotor, and optionally all the permanent magnets of the rotor, depending on whether it has one or more pairs of fixation elements. For fixing one permanent magnet, fixation elements of a plurality of laminations are provided.

The fixation elements have the advantage that they compensate for production tolerances of the permanent magnets. Since the fixation elements fix one permanent magnet on sides remote from one another of the permanent magnet and in particular firmly clamp it, they position the permanent magnet centrally between them regardless of its production tolerance.

Another advantage is that the fixation elements keep the permanent magnets of the rotor positioned during the adhesive bonding, potting or spraying until an adhesive, plastic or synthetic resin has cured. Upon insertion of the rotor into a guard tube as well, the fixation elements keep the permanent magnets positioned.

An additional advantage of the fixation elements is that they contribute to a transmission of moment and offer protection against displacement in the event of a mechanical defect of the electrical machine.

According to one embodiment the short-circuit element has laminations rotated relative to one another, between whose spring elements various permanent magnets are firmly clamped. The laminations are rotated relative to one another by 360°, divided by the number of permanent magnets or a multiple of that number. Because of the contrary rotation of the laminations it is possible to provide fewer pairs of spring elements for one lamination than the rotor has permanent magnets. For instance, pairs of spring elements may be provided for alternate permanent magnet in one lamination. This is advantageous or necessary if it is difficult or impossible to provide pairs of spring elements on one lamination for all the permanent magnets, for reasons of space. Moreover, the contrary rotation of the laminations has the advantage that over a surface area of the laminations, fluctuating lamination thicknesses and warped laminations are compensated for, especially if such shape defects are systematic or in other words exist for all the laminations. The laminations can have sides of different thicknesses, for instance from rolling of the sheet metal, and these shape defects may be the same for each lamination.

The rotor of the invention is intended in particular as a so-called inner rotor, with permanent magnets disposed on an outer circumference of the lamination packet of the short-circuit element. However, it is fundamentally also possible to embody the rotor as a so-called outer rotor, with permanent magnets disposed on an inside circumference of the lamination packet. In that case, laminations of the lamination packet must be annular or in other words have a hole.

Preferably, the fixation elements are spring elements (claim 6), which clamp the permanent magnets between them by their spring elasticity. As a result, compensation for permanent magnets of different widths is attained.

BRIEF DESCRIPTION OF THE DRAWING

The invention will be described in further detail herein below, with reference to the drawings, in which.

DESCRIPTION OF THE PREFERRED EMBODIMENT

Figure 1:
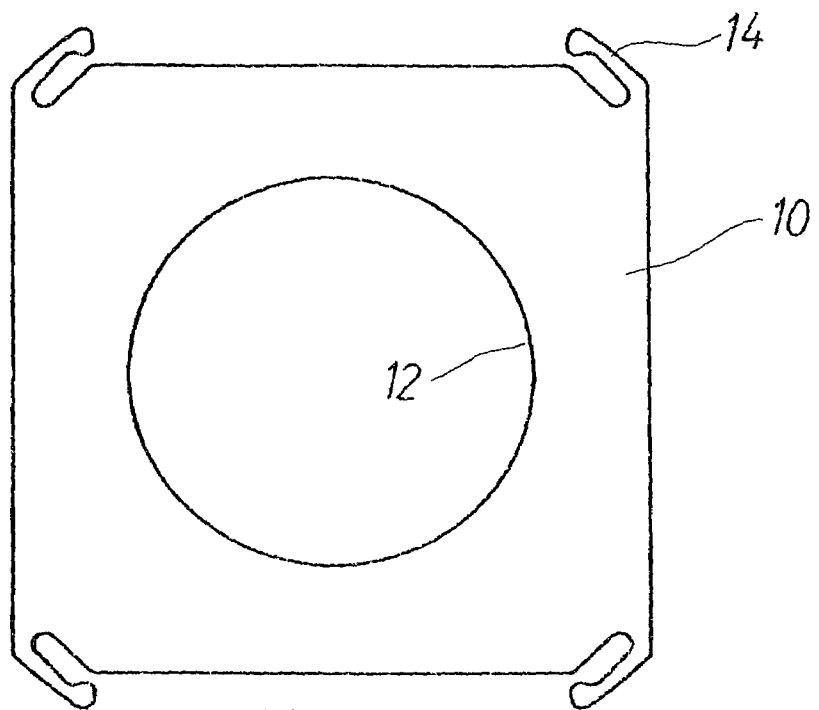
FIG. 1 is an elevation view of a lamination of a rotor of the invention

The lamination element or lamina 10 shown in FIG. 1 is stamped out of a metal sheet and has a substantially square shape with a center hole 12. On each corner, the lamination element 10 has a spring element 14, which is embodied as a spring tongue that is integral with the lamination element 10 and is produced in one operation along with the stamping out of the lamination element 10. Instead of being stamped, the lamination element 10 can also be produced with the spring elements 14 by laser cutting, water-jet cutting, erosion, or some other method. Two adjacent spring elements 14 each face toward one another and are associated with one another and form one pair of spring elements 14. In FIG. 1, the two upper and the two lower spring elements 14 are associated with one another respectively and form a pair.

Figure 2:
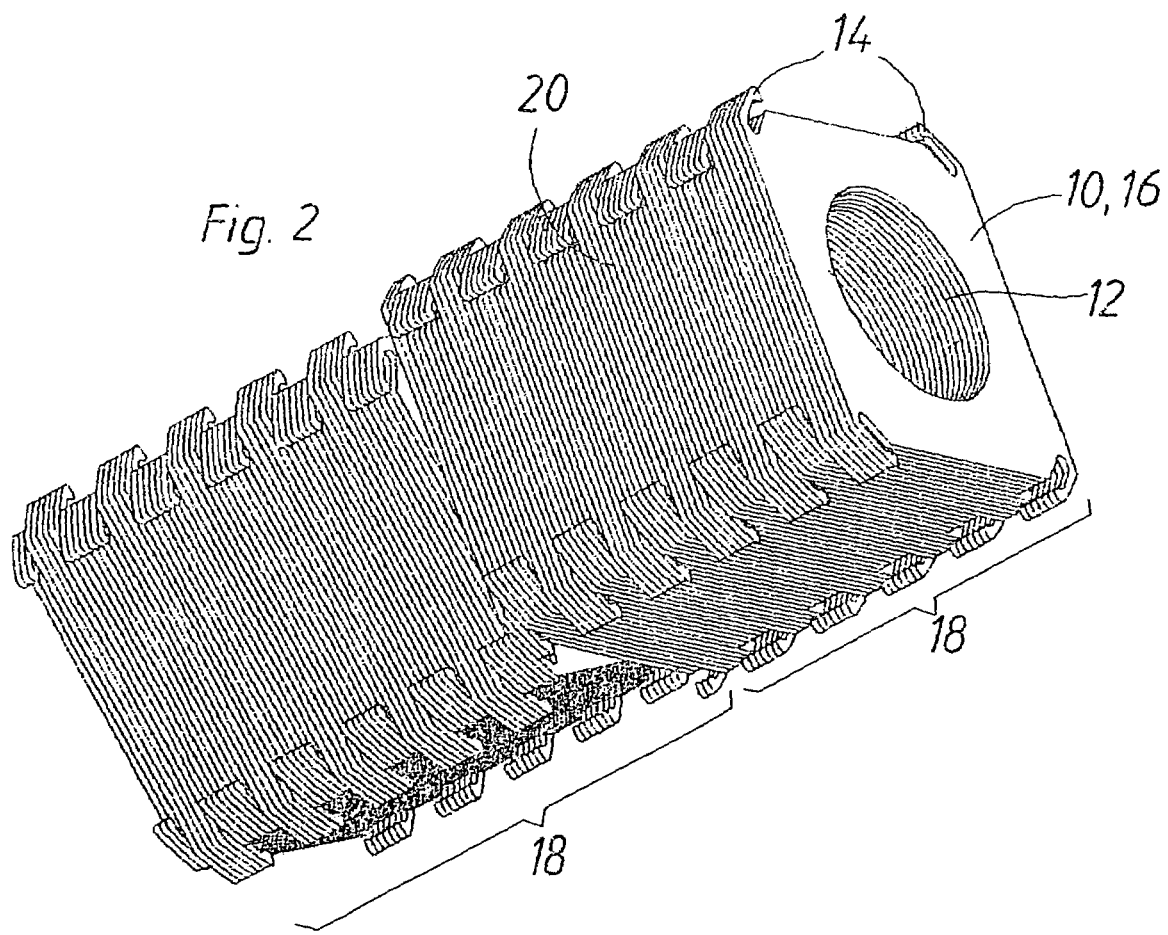
FIG. 2 is a perspective view of a short-circuit element of the rotor of the invention with lamination packets composed of laminations as in FIG. 1, in perspective.

For producing a short-circuit element 16, shown in FIG. 2, of a rotor of the invention, lamination elements 10 are assembled into a lamination packet 18. All the lamination elements 10 of the lamination packet 18 are identical and have the shape shown in FIG. 1. In each case, a number of lamination elements 10, for example, five to six of them, each are put together congruently. The next five to six lamination elements 10, for example, are rotated by 90°. The rotational angle of 90° applies to the exemplary embodiment of the invention shown and described, in which the rotor has four permanent magnets. In general, the rotational angle of the lamination elements 10 is 360°, divided by the number of permanent magnets. By the rotation of the lamination elements 10 relative to one another, the short-circuit element 16 has pairs 14 of spring elements distributed over its axial length on all four outer or circumferential sides 20, even though the individual lamination elements 10 have pairs 14 of spring elements on only two of four outer sides.

The next five to six lamination elements 10 after that are rotated by a further 90° compared to the first lamination elements 10, that is, by 180° in all. As a result, systematic errors of thickness and shape in the lamination elements 10 that are dictated by production are compensated for. Systematic means that the inaccuracy of each lamination element 10 is present at the same place. This kind of production inaccuracy can for instance be a local difference in thickness or a local bulging of the lamination element 10 that is present at the same place on each lamination element 10. Such systematic inaccuracies of shape are compensated for by the rotation of the lamination elements 10 by 90°, 180°, 270°, and 0°/360° relative to one another.

Figure 3:
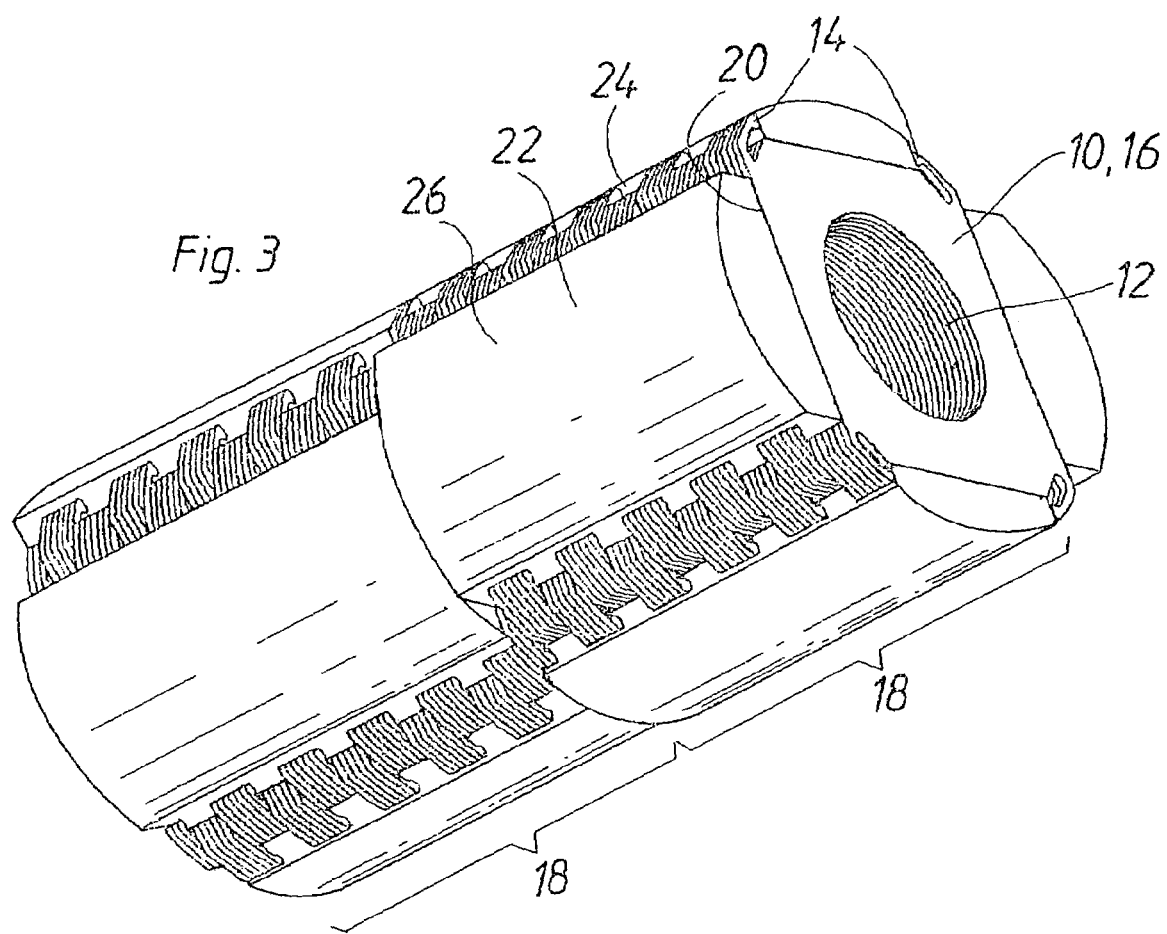
FIG. 3 is a perspective view the short-circuit element of FIG. 2, with permanent magnets.

The rotor of the invention has four permanent magnets 22 (FIG. 3). The permanent magnets 22 have a D-shaped cross section ("bread loaf shape"); that is, they have a flat bottom side, with which they rest on the outside 20 of the rotor. Longitudinal side faces 24 of the permanent magnets 22, which faces are axially parallel to the rotor, are perpendicular to the bottom face and are low in proportion to a width of the bottom face. An outer face 26, remote from the short-circuit element 16, of the permanent magnets 22 is curved cylindrically, and a cylinder radius matches a spacing of the outer face 26 from an imaginary rotor axis.

In other embodiments of the invention, the number and shape of the permanent magnets 22 can differ from what is given above. For instance, the permanent magnets 22 may be in the shape of cylindrical shells (not shown) instead of D-shaped. In this case, the lamination elements 10 preferably have a circular basic shape instead of a square shape, and the permanent magnets rest with a concave inner face on the convexly curved circumferential edge of the 1 lamination elements. It is also not compulsory for the cylinder radius of the outer face 26 of the permanent magnets 22 to match a spacing from the imaginary rotor axis.

The permanent magnets 22 are inserted between the pairs 14 of spring elements; the spring elements 14 press spring-elastically against the longitudinal side faces 24 of the permanent magnets 22 and firmly clamp the permanent magnets 22 between them in this way and thus also to the short-circuit element 16. Since the spring elements 14 press simultaneously from both sides against the permanent magnets 22, the spring elements 14 position the permanent magnets 22 in the lateral (tangential or circumferential) direction and compensate for production tolerances of the permanent magnets 22. The spring elements 14 retain the permanent magnets 22 while the permanent magnets 22 are being connected to the short-circuit element 16, for instance by adhesive bonding, potting with a synthetic resin, or spray-coating with plastic. The short-circuit element 16 with the permanent magnets 22 can also be inserted for instance into a so-called guard tube, not shown. For producing the rotor of the invention, a rotor shaft, not shown, is press-fitted into the hole 12 or inserted in some other way so as to be secured against relative rotation.

As can be seen in FIGS. 1 and 2, the short-circuit element 16 has two identical lamination packets 18, each with its own permanent magnets 22. The lamination packets 18 are rotated relative to one another by an angle of 15°, for instance, so that a magnetic pole generated by the permanent magnet 22 of the rotor is quasi-oblique. As a result, the resting moment and the moment waviness of the rotor are reduced. The rotor can have more than two lamination packets 18 rotated relative to one another.

The foregoing relates to preferred exemplary embodiments of the invention, it being understood that other variants and embodiments thereof are possible within the spirit and scope of the invention, the latter being defined by the appended claims.

The invention claimed is:

1. A rotor for an electrical machine, comprising
a short-circuit element (16) including a lamination packet (18) with a plurality of lamination elements (10),
a number of permanent magnets disposed on the short-circuit element, at least one pair of fixation elements (14) on at least selected lamination elements (10), the fixation elements (14) being integral with the lamination elements (10); and a permanent magnet (22) being retained between two fixation elements (14) of one or more lamination elements (10) of the rotor, wherein the short-circuit element (16) comprises lamination elements (10) rotated relative to one another, between whose fixation elements (14) different permanent magnets (22) are retained, wherein the number of pairs of fixation elements on at least selected lamination elements (10) is lower than the number of permanent magnets disposed on the short-circuit element, and wherein the distance between each pair of fixation elements is essentially equal to the width of the permanent magnets.

2. The rotor of claim 1, wherein the permanent magnets (22) are disposed on a circumference of the lamination packet (18); and wherein the fixation elements (14) press against sides (24), which are axially parallel to the rotor, of a permanent magnet (22).

3. The rotor of claim 2, wherein the permanent magnets (22) are disposed on an outer circumference of the lamination packet (18).

4. The rotor of claim 1, wherein each of the selected lamination elements(10) have a spring element (14) as its fixation element; and wherein one permanent magnet (22) is firmly clamped between two spring elements (14) of one or more lamination elements (10).

5. The rotor of claim 2, wherein each of the selected lamination elements (10) have a spring element (14) as its fixation element; and wherein one permanent magnet (22) is firmly clamped between two spring elements (14) of one or more lamination elements (10).

6. The rotor of claim 3, wherein each of the selected lamination elements (10) have a spring element (14) as its fixation element; and wherein one permanent magnet (22) is firmly clamped between two spring elements (14) of one or more lamination elements (10).

7. The rotor of claim 1, wherein the rotor has at least two lamination packets (18), rotated relative to one another, each with its own permanent magnets (22), and a rotational angle of the lamination packets (18) relative to one another deviates from a rotational angle of lamination elements (10), rotated relative to one another, of one lamination packet (18).

8. The rotor of claim 4, wherein the rotor has at least two lamination packets (18), rotated relative to one another, each with its own permanent magnets (22), and a rotational angle of the lamination packets (18) relative to one another deviates from a rotational angle of lamination elements (10), rotated relative to one another, of one lamination packet (18).

9. A rotor for an electrical machine, comprising
a short-circuit element (16) including a lamination packet (18) with a plurality of lamination elements (10),
a number of permanent magnets disposed on the short-circuit element,
at least one fixation element (14) on at least selected lamination elements (10), the fixation elements (14) being integral with the lamination elements (10); and
a permanent magnet (22) being retained between two fixation elements (14) of one or more lamination elements (10) of the rotor, wherein the short-circuit element (16) comprises lamination elements (10) rotated relative to one another, between whose fixation elements (14) different permanent magnets (22) are retained, and wherein a selected lamination element (10) has fewer fixation elements (14) than would be required to receive all the permanent magnets (22) of a lamination packet (18), and a plurality of lamination elements (10) rotatable counter to one another are required in order to hold all the permanent magnets (22).

10. The rotor of claim 9, wherein the permanent magnets (22) are disposed on a circumference of the lamination packet (18); and wherein the fixation elements (14) press against sides (24), which are axially parallel to the rotor, of a permanent magnet (22).

11. The rotor of claim 10, wherein the permanent magnets (22) are disposed on an outer circumference of the lamination packet (18).

12. The rotor of claim 9, wherein each of the selected lamination elements (10) have a spring element (14) as its fixation element; and wherein one permanent magnet (22) is firmly clamped between two spring elements (14) of one or more lamination elements (10).

13. The rotor of claim 10, wherein each of the selected lamination elements (10) have a spring element (14) as its fixation element; and wherein one permanent magnet (22) is firmly clamped between two spring elements (14) of one or more lamination elements (10).

14. The rotor of claim 11, wherein each of the selected lamination elements (10) have a spring element (14) as its fixation element; and wherein one permanent magnet (22) is firmly clamped between two spring elements (14) of one or more lamination elements (10).

15. The rotor of claim 9, wherein the rotor has at least two lamination packets (18), rotated relative to one another, each with its own permanent magnets (22), and a rotational angle of the lamination packets (18) relative to one another deviates from a rotational angle of lamination elements (10), rotated relative to one another, of one lamination packet (18).

16. The rotor of claim 12, wherein the rotor has at least two lamination packets (18), rotated relative to one another, each with its own permanent magnets (22), and a rotational angle of the lamination packets (18) relative to one another deviates from a rotational angle of lamination elements (10), rotated relative to one another, of one lamination packet (18).

17. The rotor of claim 9, wherein pairs of fixation elements (14) are provided for alternate permanent magnets in one selected lamination element (10).

18. The rotor of claim 9, wherein one or more lamination elements (10) are rotated relative to one another by 360, divided by the number of permanent magnets disposed on the short-circuit element or a multiple of that number.

19. The rotor of claim 9, wherein the lamination packet (18) includes a plurality of lamination elements (10) fixed together congruently to form a first lamination and another plurality of lamination elements (10) are fixed together congruently to form a second lamination and wherein the first and second laminations are rotated relative to one another.

* * * * *